UNITED STATES PATENT OFFICE.

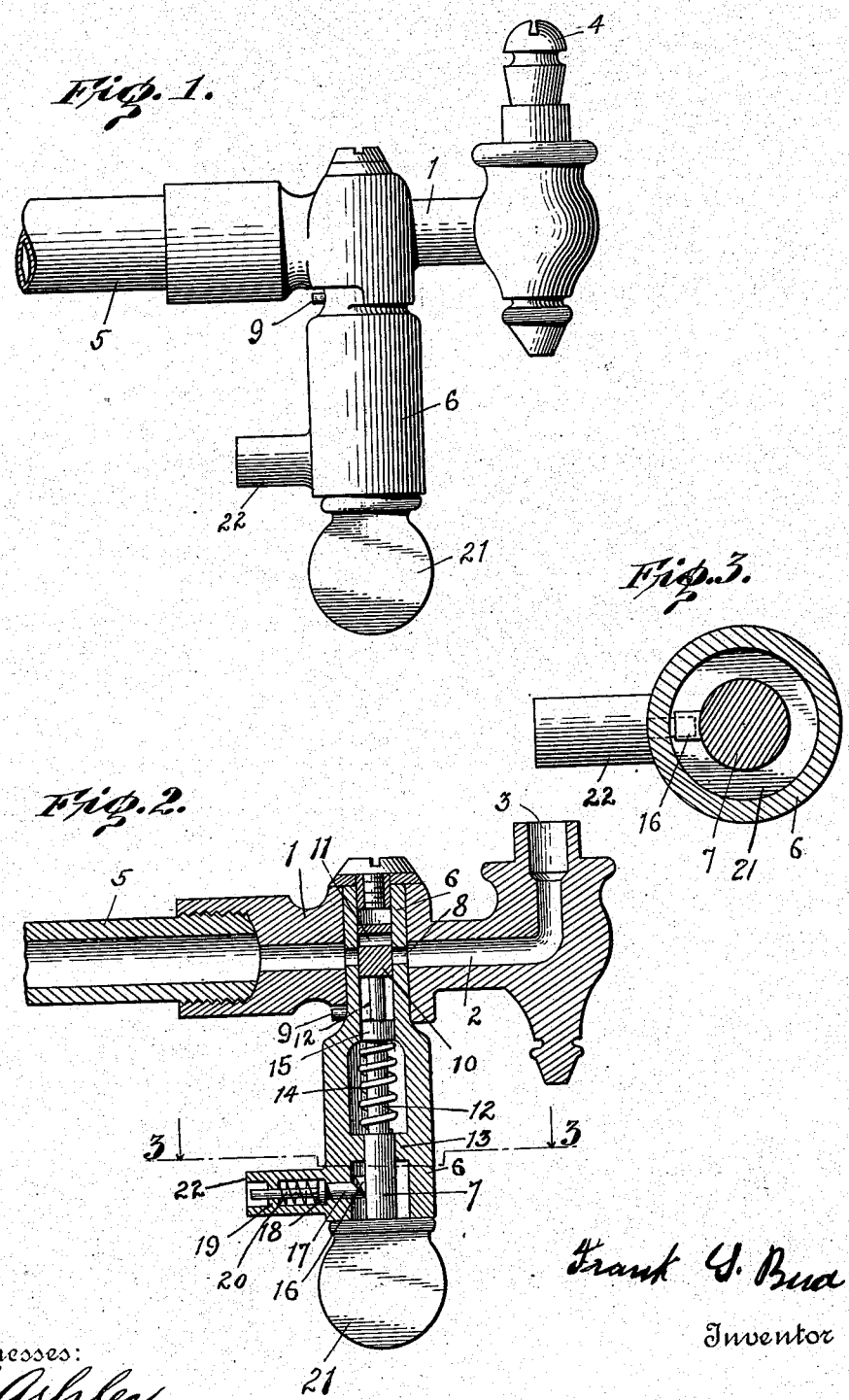

FRANK S. BUA, OF LODI, NEW JERSEY.

SAFETY-COCK.

1,014,805.  Specification of Letters Patent.  Patented Jan. 16, 1912.

Application filed July 13, 1911. Serial No. 638,415.

*To all whom it may concern:*

Be it known that I, FRANK S. BUA, a citizen of the United States, and a resident of the borough of Lodi, in the county of Bergen and State of New Jersey, have invented a certain new and useful Safety-Cock, of which the following is a specification.

My invention relates to improvements in safety cocks and the object of my invention is to provide a cock for illuminating gas and the like, whereby the danger of the accidental escape of gas by reason of the partial opening or closing of the valve may be minimized. I accomplish this object by the device illustrated in the accompanying drawings in which—

Figure 1 is a view of the device in elevation. Fig. 2 is a vertical section of the same. Fig. 3 is a cross section of the same on the line 3—3 in Fig. 2.

Similar characters refer to similar parts throughout the several views.

In the cocks at present in use there is great danger of the escape of poisonous and injurious gases into the atmosphere by reason of the accidental opening of the valve when the gas is not burning and by the partial closing of the valve so that the light is extinguished without entirely shutting off the flow of gas. In my device these dangers are entirely obviated.

My device comprises a body member 1 provided with a longitudinal duct 2 terminating in the orifice 3 for a tip 4 of any desired form. The body member is preferably screw threaded at its base for the usual pipe connection 5. Intermediate its ends the body member is provided with a vertical cylindrical aperture to receive the valve member 6. This valve member 6 is hollow to receive the plunger 7 and is provided with a port 8 lying in the plane of the longitudinal duct 2 of the body member 1 and is preferably rotatable in the body member 1, a stop 9 being provided to prevent its being turned completely around. The plunger 7 comprises a cylindrical head 10 provided with a port 11 and having a rod 12 depending therefrom and sliding within a collar 13 in the valve member 6.

Upon the plunger rod 12 I provide a spring 14 bearing at its lower extremity upon the collar 13 and at its upper extremity bearing against a collar 15 upon the plunger rod 12 whereby the plunger is normally held in its raised position closing the port 8. Upon the plunger 7 I provide a lug 16 set in the vertical plane of a catch 17 set in the wall of the valve member 6. The said catch or bolt 17 being provided with a shoulder 18 and sliding within a collar 19 in a tubular projection 22 upon the valve member 6. A spring 20 is provided between the shoulder 18 and collar 19 whereby the catch or bolt 17 is normally held in its innermost position. Upon the lower end of the plunger 7 I provide a finger hold 21.

The parts being thus assembled the port 8 is normally closed. When it is desired to open the cock the plunger 7 is pulled down by the finger hold 21 until the lug 16 is brought under and caught by the catch or bolt 17 and when in this position the port 11 of the plunger head 10 will lie in the line of the ports 8 of the valve member 6 thus opening the cock for the passage of gas to the burner 4. To shut off the supply of gas the plunger 7 is turned by means of the fingerhold 21 whereby the lug 16 is released from its engagement with the catch 17 whereupon the spring 14 will force the plunger up into the head of the valve member 6 closing the port 8. It is therefore apparent that when the plunger and finger hold are in their raised position the gas is completely shut off and while in this position the turning of the finger hold and valve member will not result in opening the port and turning on the gas which can be done only by pulling down the finger hold and that the position of the finger hold in the valve member will always serve as a notice or warning of the position of the port.

Having thus described my invention what I claim is—

1. In a device of the character described a body member having a longitudinal gas passage, a valve member therein and having a port, a plunger in the valve member provided with a head also having a port which lies normally out of the plane of the port in the valve member, a catch in the valve member, a lug upon the plunger member adapted to engage said catch when the plunger member is extended and a spring adapted to hold the plunger in its normal position substantially as shown and described.

2. In a device of the character described, a body member having a longitudinal gas passage, a valve member therein having a port, a plunger having a port in its head, a spring upon the plunger adapted to hold the port in the plunger head away from the port in the valve member and a catch in the valve member adapted to hold the plunger out of its normal position substantially as shown and described.

3. In a device of the character described, a body member having a longitudinal gas passage, a valve member therein having a port lying in the plane of the said gas passage and revoluble in the body member, a plunger in said valve member provided with a head having a port formed therein, a spring upon the plunger adapted to hold the port in the plunger head out of the port in the valve member, a finger hold upon the plunger whereby the plunger may be extended to bring its port within the port in the valve member and a catch for holding the plunger in an extended position substantially as shown and described.

Signed at the borough of Lodi in the county of Bergen and State of New Jersey this 12th day of July A. D. 1911.

FRANK S. BUA.

Witnesses:
FRANK VLETT, Jr.,
VINCERZLE PLESIRA.

Copies of this patent may be obtained for five cents each, by addressing the "Commissioner of Patents, Washington, D. C."